United States Patent

Shimotani et al.

(10) Patent No.: US 6,725,458 B2
(45) Date of Patent: Apr. 20, 2004

(54) ON-VEHICLE INFORMATION PROCESSING UNIT

(75) Inventors: Mitsuo Shimotani, Tokyo (JP); Akio Uekawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 471 days.

(21) Appl. No.: 09/734,210

(22) Filed: Dec. 12, 2000

(65) Prior Publication Data

US 2001/0005866 A1 Jun. 28, 2001

(30) Foreign Application Priority Data

Dec. 24, 1999 (JP) .......................... 11-368238

(51) Int. Cl.[7] ............................ G06F 13/10
(52) U.S. Cl. ........................ 719/321; 710/74
(58) Field of Search ............ 709/321; 719/321

(56) References Cited

U.S. PATENT DOCUMENTS

| | | | |
|---|---|---|---|
| 5,265,252 A | | 11/1993 | Rawson, III et al. |
| 5,324,678 A | * | 6/1994 | Kusunoki .................. 438/459 |
| 5,483,647 A | * | 1/1996 | Yu et al. ..................... 713/100 |
| 5,564,061 A | | 10/1996 | Davies et al. |
| 5,794,164 A | | 8/1998 | Beckert et al. |
| 5,910,180 A | * | 6/1999 | Flory et al. .................. 709/321 |

| | | |
|---|---|---|
| 2001/0002449 A1 | 5/2001 | Eisenmann et al. |

FOREIGN PATENT DOCUMENTS

| | | |
|---|---|---|
| DE | 4117042 | 11/1991 |
| DE | 19622531 | 12/1997 |
| DE | 19750662 | 5/1999 |
| EP | 0864964 | 9/1998 |
| JP | 63039068 | 2/1988 |
| JP | 11-211489 | 8/1999 |

OTHER PUBLICATIONS

Ogilvy, Method and Apparatus for Controlling Communication, Mar. 16, 1998.*

* cited by examiner

Primary Examiner—Meng-Al T. An
Assistant Examiner—LeChi Truong
(74) Attorney, Agent, or Firm—Leydig, Voit & Mayer, Ltd.

(57) ABSTRACT

An on-vehicle information processing unit includes a central processing unit; a first device connected to the central processing unit; a device-dependent driver for driving only the first device; an operating-system-standard (OS-standard) driver enabling an application to drive devices different from the first device; a device-dependent application using the first device through the device-dependent driver; and an OS-dependent application for using the first device through the OS-standard driver. The central processing unit can include a switch for enabling the OS-dependent application only when using an Internet function, and for operating the device-dependent application in a normal mode.

9 Claims, 16 Drawing Sheets

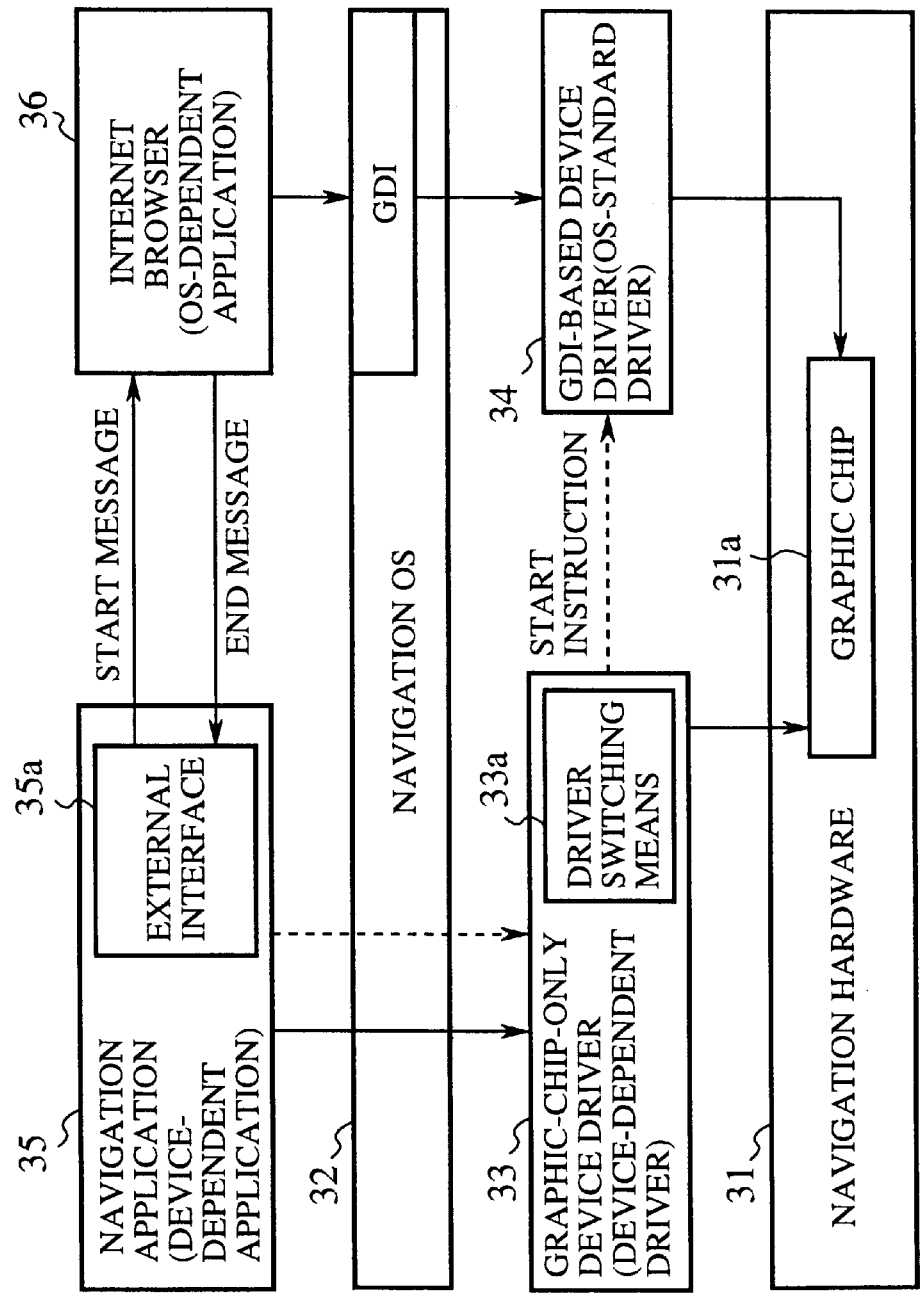

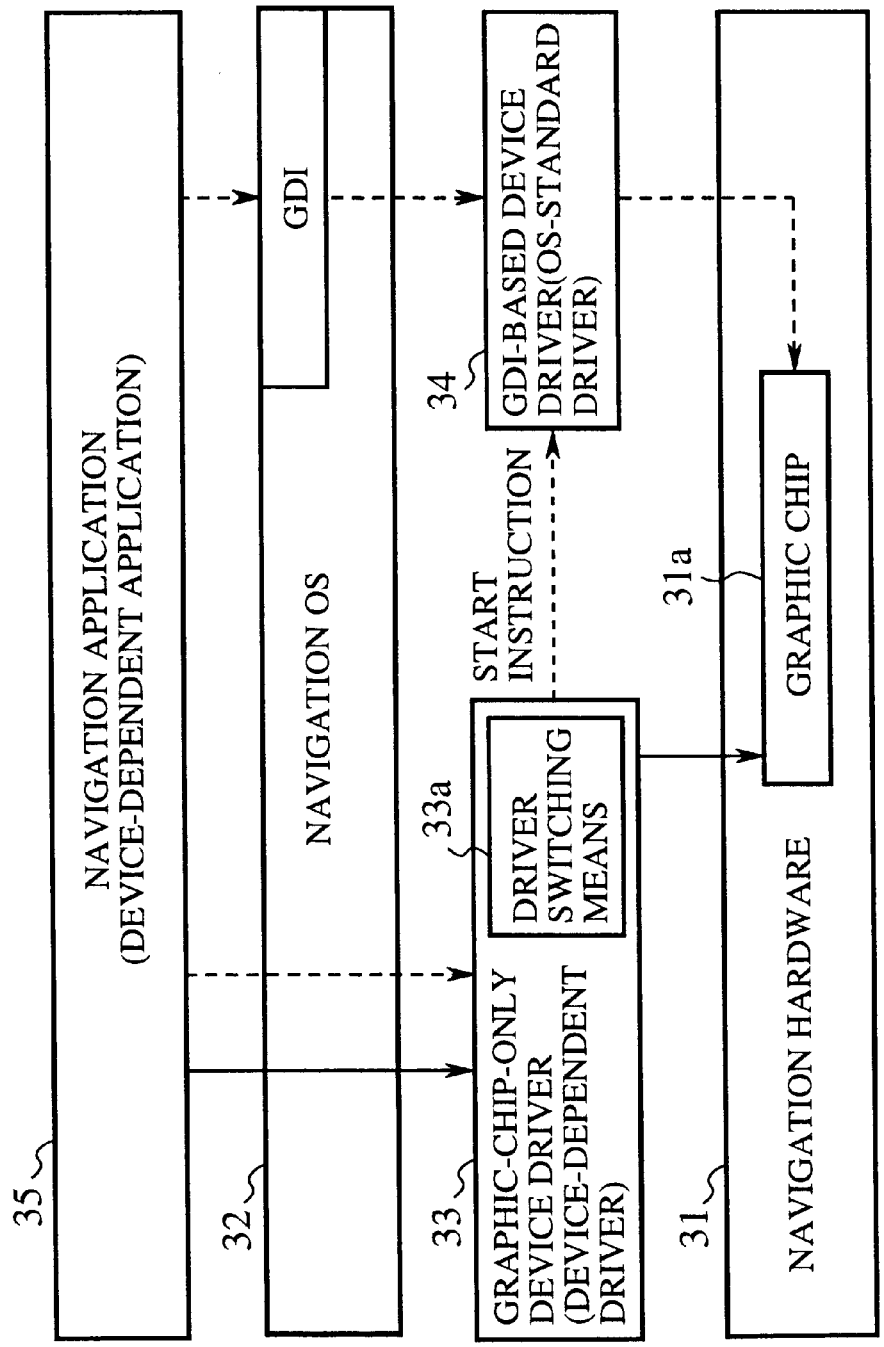

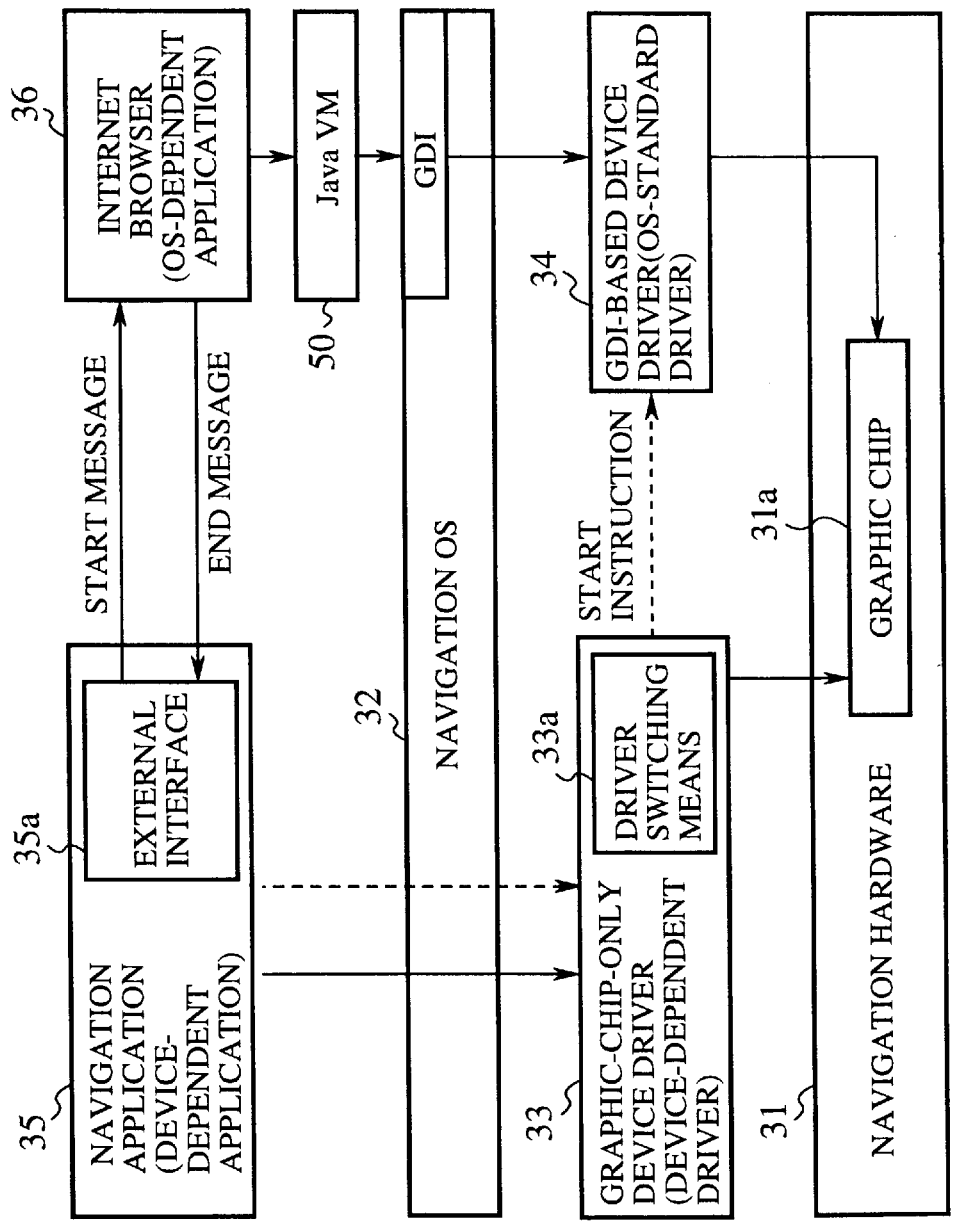

31a

31a

31a

31a

31a

31a

31a

31a

31a

31a

ON-VEHICLE INFORMATION PROCESSING UNIT

BACKGROUND OF THE INVENTION

1. Field of the Invention

The present invention relates to an on-vehicle information processing unit that meets the requirement of high-speed processing such as map drawing.

2. Description of Related Art

FIG. 16 is a block diagram showing a hierarchical configuration of a conventional navigation system. In FIG. 16, the reference numeral 101 designates navigation hardware including a DVD-ROM drive, a display monitor, a GPS receiver, a vehicle speed pulse counter, a gyroscope and the like. The reference numeral 102 designates a navigation OS (operating system) including basic functions such as memory management of programs, process management and thread management in conjunction with a function of controlling navigation hardware 101. The reference numeral 103 designates a graphic-chip-only device driver for directly controlling a graphic chip of the navigation hardware 101; 104 designates a navigation application; and 105 designates an Internet browser for carrying out program communications with the navigation application 104 via an external interface (I/F) 104a.

Next, the operation of the conventional navigation system will be described.

Starting its operation, the navigation application 104 commands the graphic chip 101a to execute a display operation through the graphic-chip-only device driver 103, thereby carrying out high-speed drawing. In the display state, the navigation application 104 starts the Internet browser 105 through the external I/F 104a to display an Internet browser screen on the graphic chip 101a.

With the foregoing configuration, the conventional on-vehicle information processing unit executes a program using the dedicated driver (graphic-chip-only device driver 103) to achieve the best performance of the device (graphic chip 101a) without using drivers installed in the operating system (OS). Accordingly, a general-purpose application, which is designed to operate using the drivers prepared in the OS, cannot work without change. To enable its operation, it is necessary for the general-purpose application like an Internet browser to use a device driver specifically designed for the application in accordance with the rule proper to the device driver. Thus, the dedicated device driver suitable for the general-purpose application must be developed. This presents a problem of requiring a large number of man-hours to develop it, making it difficult to utilize the available resources of the general-purpose application.

For example, when a system is configured such that it operates the navigation application (device-dependent application) on the Windows CE by using a dedicated device driver, a problem arises that the system cannot make use of general-purpose applications like an Internet browser, so-called Windows applications, which utilize GDI (graphics device interface) compatible device drivers that employ a common interface, and hence adapt to different drawing devices.

SUMMARY OF THE INVENTION

The present invention is implemented to solve the foregoing problem. It is therefore an object of the present invention to provide an on-vehicle information processing unit extending its applications and implementing high-speed processing at the same time.

According to one aspect of the present invention, there is provided an on-vehicle information processing unit comprising: a central processing unit; a device connected to the central processing unit; a device-dependent driver for driving only the device; an operating-system-standard (OS-standard) driver enabling an application to drive different devices; a device-dependent application for using the device through the device-dependent driver; and an operating-system-dependent (OS-dependent) application for using the device through the OS-standard driver.

Here, the central processing unit may comprise switching means for enabling the OS-dependent application only when using an Internet function, and for operating the device-dependent application in a normal mode.

The device-dependent driver may further comprise driver switching means for switching between the device-dependent driver and the OS-standard driver.

The device-dependent application may control the driver switching means by carrying out inter-program communication with the OS-dependent application.

The on-vehicle information processing unit may further comprise a device driver switching module for enabling the device-dependent driver in response to a request of the device-dependent application, and for enabling the OS-dependent driver in response to a request of the OS-dependent application.

The device driver switching module may enable one of the device-dependent driver and OS-dependent driver in response to an operation of a manual switch.

The central processing unit may further comprise a program managing module for controlling execution of the device-dependent application and the OS-dependent application, and the device driver switching module switches the device drivers in response to a request of the program managing module.

The device may be a display device having multi-display layers, and display an image associated with the device-dependent application on an upper layer, and an image associated with the OS-dependent application on a lower layer.

The device may simultaneously display images associated with both the device-dependent application and the OS-dependent application by limiting at least one of display areas of the upper display layer and the lower display layer.

The OS-dependent application may operate on a virtual machine.

BRIEF DESCRIPTION OF THE DRAWINGS

FIG. 2 is a block diagram showing a hierarchical configuration of an embodiment 1 of the navigation system in accordance with the present invention;

FIG. 4 is a block diagram showing a hierarchical configuration of an embodiment 2 of the navigation system in accordance with the present invention;

FIG. 5 is a block diagram showing a hierarchical configuration of an embodiment 4 of the navigation system in accordance with the present invention;

DETAILED DESCRIPTION OF THE PREFERRED EMBODIMENTS

The invention will now be described with reference to the accompanying drawings.

Embodiment 1

Figure 1:
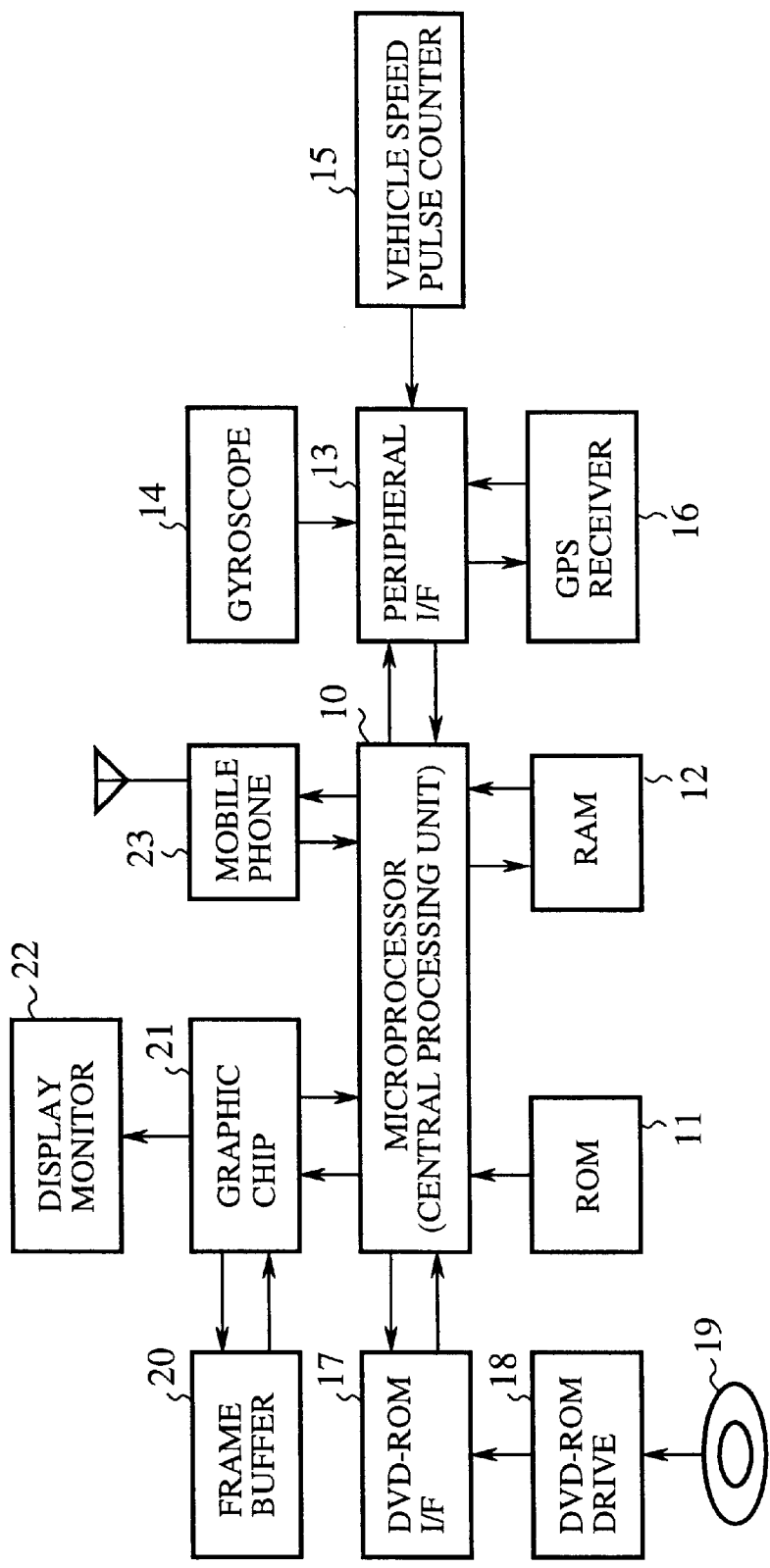
FIG. 1 is a block diagram showing a hardware configuration of an on-vehicle information processing unit in accordance with the present invention.

FIG. 1 is a block diagram showing a hardware configuration of an on-vehicle information processing unit in accordance with the present invention. In FIG. 1, the reference numeral 11 designates a ROM prestoring programs such as a navigation OS, device drivers and navigation applications; 10 designates a microprocessor (central processing unit) for executing those programs; and 12 designates a RAM for storing these programs and data when executing the programs.

The reference numeral 18 designates a DVD-ROM drive for driving a DVD (Digital Versatile Disk)-ROM 19 to read data; and 17 designates a DVD-ROM interface for transferring data between the DVD-ROM drive 18 and the microprocessor 10. The reference numeral 21 designates a graphic controller (graphic chip) for writing image data to a frame buffer 20 when the microprocessor 10 outputs the image data or an image processing instruction, and for drawing an image corresponding to the image data to a display monitor 22 like a liquid crystal display. The reference numeral 23 designates a mobile phone for connecting the microprocessor 10 to the Internet.

The reference numeral 16 designates a GPS receiver for receiving radio waves from GPS satellites; 15 designates a vehicle speed pulse counter mounted on an axle of a vehicle for measuring its speed; 14 designates a gyroscope for detecting the bearing of the vehicle; and 13 designates a peripheral interface for transferring data between the microprocessor 10 and the GPS receiver 16, vehicle speed pulse counter 15 and gyroscope 14.

The reference numeral 19 designates the DVD-ROM for prestoring a map database and the like. In addition to these components, there are installed a speaker for outputting voice guidance, a driver of the speaker, an FM multiplexed broadcasting transceiver for communicating with external infrastructure, a radio/optical beacon receiver and the like.

Incidentally, a recording medium such as a DVD-ROM can be used instead of the ROM 11 to record the navigation OS, device drivers, navigation applications and the like so that these programs are read out of it to be used.

FIG. 2 is a block diagram showing a hierarchical configuration of the embodiment 1 of the navigation system in accordance with the present invention. In FIG. 2, the reference numeral 31 designates navigation hardware including the DVD-ROM drive 18, the display monitor 22, the GPS receiver 16, the vehicle speed pulse counter 15, the gyroscope 14 and the like. It includes a graphic chip 31a that corresponds to the graphic chip 21 of FIG. 1 as one of the devices. The reference numeral 32 designates a navigation OS including basic functions such as memory management of programs, process management and thread management in conjunction with a function of controlling navigation hardware 31. The reference numeral 33 designates a graphic-chip-only device driver for directly controlling the graphic chip 31a in the navigation hardware 31. It includes a driver switching means 33a. The reference numeral 34 designates a GDI-based device driver (OS-standard driver) activated by a start instruction fed from the driver switching means 33a in the graphic-chip-only device driver 33.

The reference numeral 35 designates a navigation application module (device-dependent application) consisting of application programs for implementing navigation services such as calculation of the current position, searching for a path, and path guidance. The reference numeral 36 designates a general purpose Internet browser (OS-dependent application) coded to use the GDI for carrying out interprogram communications with the navigation application 35 through the external interface (I/F) 35a.

Next, the operation of the present embodiment 1 will be described.

Figure 3A:
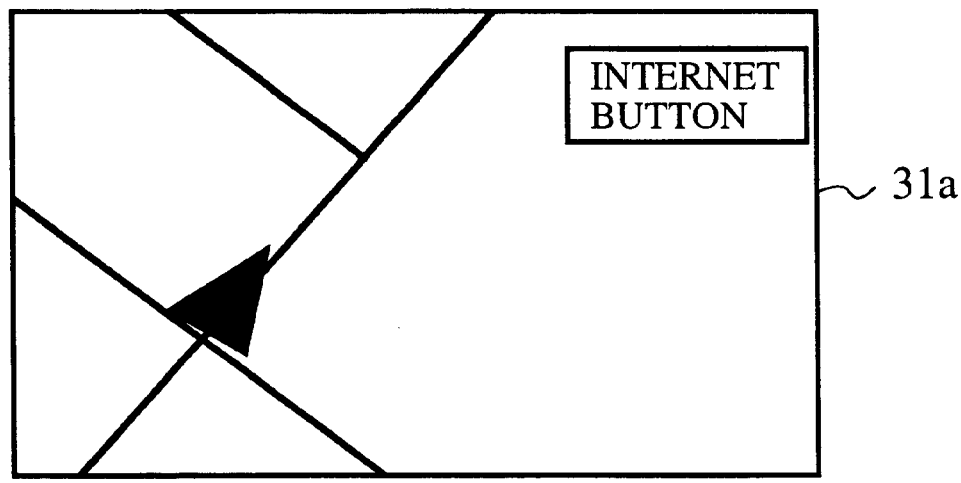
FIGS. 3(a) and 3(b) are diagrams illustrating display examples in embodiment 1 of the navigation system in accordance with the present invention.
Figure 3B:
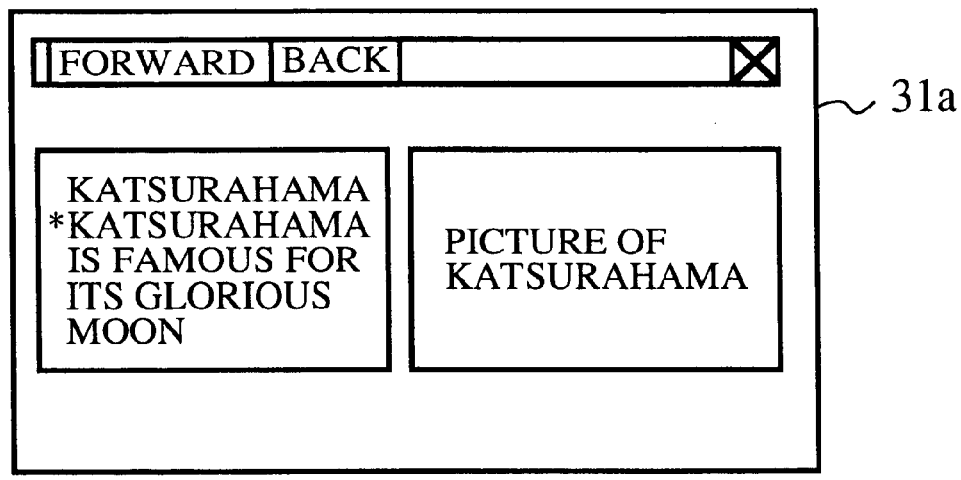

Starting its operation, the navigation application 35 commands the graphic chip 31a to execute display operation through the graphic-chip-only device driver 33, thereby carrying out high-speed drawing as shown in FIG. 3(a). In the display state, in response to the depression of the Internet button on the screen, the navigation application 35 starts the Internet browser 36 through the external I/F 35a, and enables the GDI-based device driver 34 by the start instruction sent from the driver switching means 33a in the graphic-chip-only device driver 33. Since the Internet browser 36 is coded to use the GDI, it controls the graphic chip 31a from the GDI through the GDI-based device driver 34, thereby displaying the Internet browser screen as shown in FIG. 3(b) instead of the display as shown in FIG. 3(a).

Once the Internet browser 36 has been started, an end message is sent to the navigation application 35. Receiving the end message, the navigation application 35 commands the graphic-chip-only device driver 33 to carry out switching to disable the GDI-based device driver 34 and to enable the graphic-chip-only device driver 33 by using the driver switching means 33a, thereby enabling the graphic chip 31a to display the navigation screen as shown in FIG. 3(a), again. Thus, the navigation application 35 can coexist with the Internet browser 36.

As described above, the present embodiment 1 can execute both the OS-dependent general-purpose program and device-dependent high-speed processing program.

Embodiment 2

Although the Internet browser 36 is independent of the navigation application 35 in the foregoing embodiment 1, the Internet function can be incorporated into the navigation application 35 as shown in FIG. 4 which shows a configuration of the present embodiment 2. Since the remaining configuration is the same as that of the embodiment 1, the description thereof is omitted here.

Next, the operation of the present embodiment 2 will be described.

The navigation application 35 operates as in the embodiment 1. Only when using the Internet function, the navigation application 35 commands the graphic-chip-only device driver 33 to carry out switching to disable the graphic-chip-only device driver 33 and to enable the GDI-based device driver 34 by using the driver switching means 33a, thereby executing the display as shown in FIG. 3(b).

According to the present embodiment 2, incorporating the Internet function into the navigation application can simplify its configuration as compared with that of the embodiment 1.

Embodiment 3

Although switching is carried out between the graphic-chip-only device driver 33 and the GDI-based device driver 34 to connect one of them to the graphic chip 31a in the foregoing embodiments, this is not essential. For example, another device such as a voice device can be used instead of the GDI-based device driver 34 to be switched. This offers an advantage of being able to make effective use of OS-standard applications using voice.

Embodiment 4

FIG. 5 is a block diagram showing a hierarchical configuration of an embodiment 4 of the navigation system in accordance with the present invention. The present embodiment 4 is configured such that it operates the Internet browser 36 on a virtual machine (VM) 50. The Internet browser 36 carries out inter-program communications with the navigation application 35 as in the foregoing embodiment 1. Since the remaining configuration and operation, and hence the advantage are the same as those of the embodiment 1, the description thereof is omitted here to avoid duplication.

Embodiment 5

Figure 6:
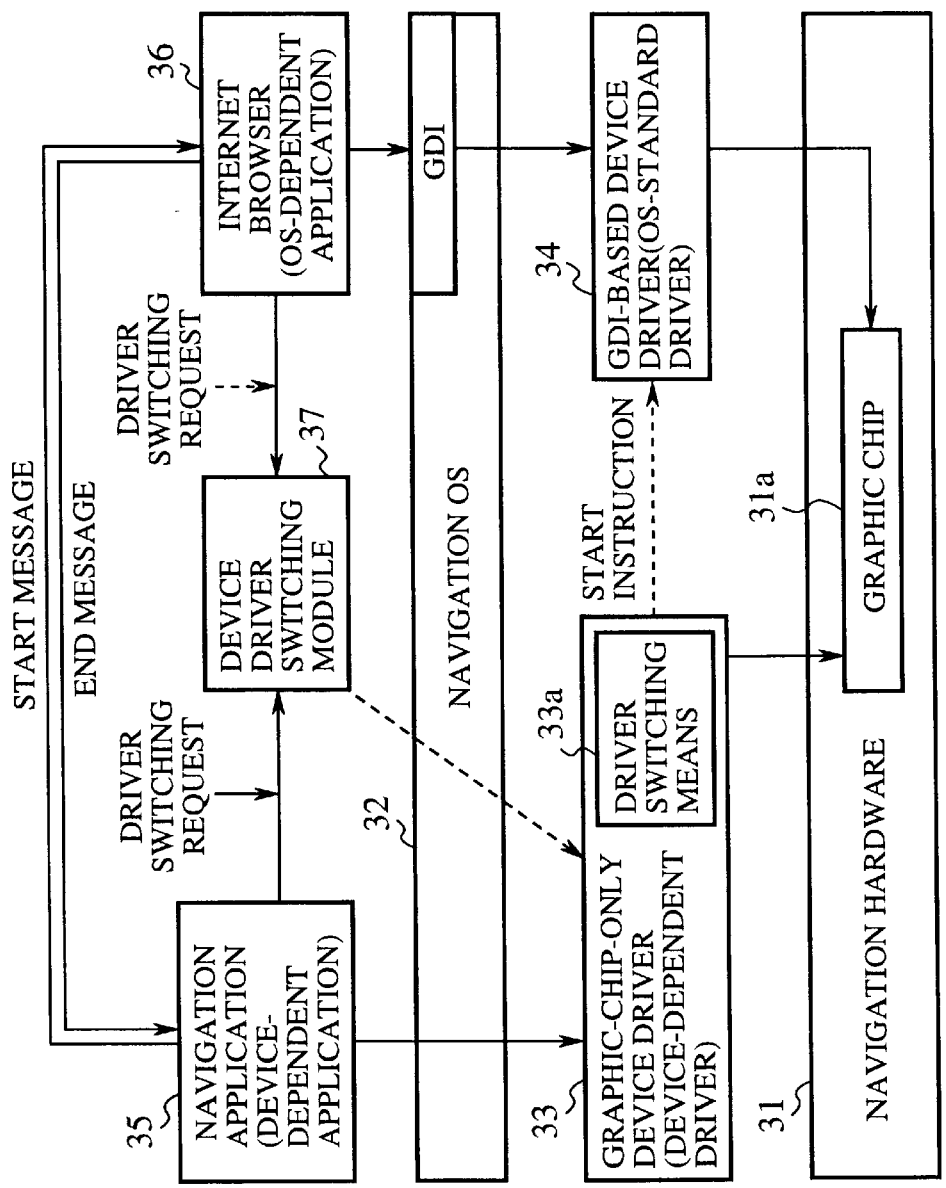
FIG. 6 is a block diagram showing a hierarchical configuration of an embodiment 5 of the navigation system in accordance with the present invention.

FIG. 6 is a block diagram showing a hierarchical configuration of an embodiment 5 of the navigation system in accordance with the present invention. The present embodiment 5 comprises a device driver switching module 37 between the navigation application 35 and the Internet browser 36. The device driver switching module 37 controls the graphic-chip-only device driver 33 to carry out switching to enable the GDI-based device driver 34 through the driver switching means 33a. Since the remaining configuration is the same as that of the foregoing embodiment 1, the description thereof is omitted here by designating the same components by the same reference numerals.

Next, the operation of the present embodiment 5 will be described.

When the navigation application 35 starts its operation with requesting the device driver switching module 37 to use the graphic-chip-only device driver 33, the device driver switching module 37 enables the graphic-chip-only device driver 33 to carry out the display as shown in FIG. 3(a).

In the display state, in response to the depression of the Internet button on the screen, the navigation application 35 starts the Internet browser 36 through the external I/F 35a. In response to a driver switching request from the Internet browser 36, the device driver switching module 37 commands the graphic-chip-only device driver 33 to carry out switching to enable the GDI-based device driver 34 by sending the start instruction from the driver switching means 33a in the graphic-chip-only device driver 33. Since the Internet browser 36 is coded to use the GDI, it controls the graphic chip 31a through the GDI in the navigation OS 32 and the GDI-based device driver 34, thereby enabling the graphic chip 31a to display the Internet browser screen as shown in FIG. 3(b) instead of the display as shown in FIG. 3(a).

Once the Internet browser 36 has been started, it sends an end message to the navigation application 35. Receiving the end message, the navigation application 35 issues a switching request to the device driver switching module 37. In response to the switching request, the device driver switching module 37 commands the graphic-chip-only device driver 33 to carry out switching to disable the GDI-based device driver 34 and to enable the graphic-chip-only device driver 33 by using the driver switching means 33a, thereby enabling the graphic chip 31a to display the navigation screen as shown in FIG. 3(a), again.

Since the present embodiment 5 includes the dedicated module for carrying out device driver switching, it offers an advantage of being able to simplify programs, facilitating producing the programs.

Embodiment 6

Figure 7:
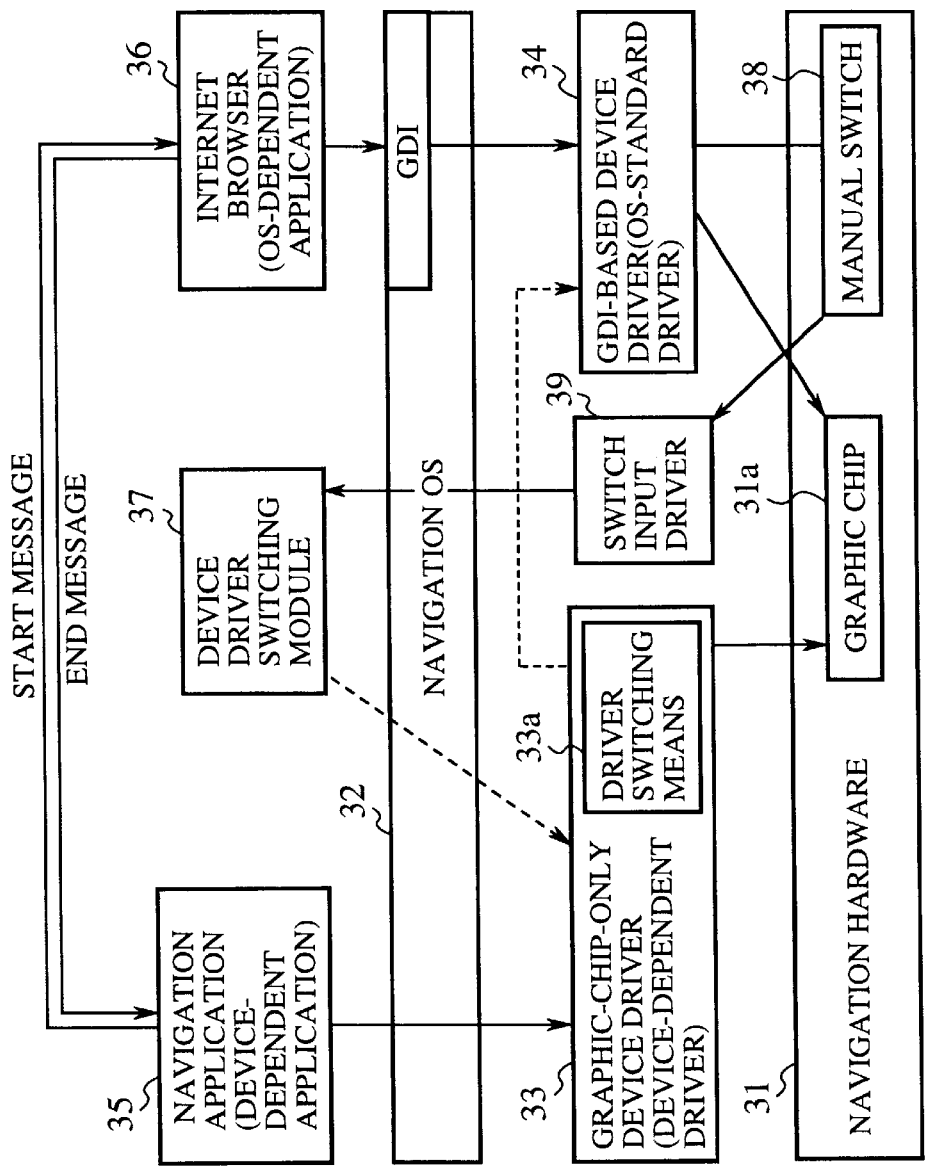
FIG. 7 is a block diagram showing a hierarchical configuration of an embodiment 6 of the navigation system in accordance with the present invention.

FIG. 7 is a block diagram showing a hierarchical configuration of an embodiment 6 of the navigation system in accordance with the present invention. The present embodiment 6 comprises a manual switch 38 in the navigation hardware 31, and a switch-input driver 39 that operates in response to a switching signal from the manual switch 38 to enable the device driver switching module 37 to carry out its switching operation. Since the remaining configuration is the same as that of the foregoing embodiment 5, the description thereof is omitted here by designating the same components by the same reference numerals.

Next, the operation of the present embodiment 6 will be described.

When a user issues a request to the switch-input driver 39 by operating the manual switch 38 to use the graphic-chip-only device driver 33, the device driver switching module 37, receiving the control signal from the switch-input driver 39, enables the graphic-chip-only device driver 33 to carry out the display as shown in FIG. 3(a).

In this display state, in response to a request from the manual switch 38 to use the GDI-based device driver 34, the switch-input driver 39 outputs the control signal. Receiving the control signal from the switch-input driver 39, the device driver switching module 37 disables the graphic-chip-only device driver 33 and enables the GDI-based device driver 34. Since the Internet browser 36 is coded to use the GDI, it controls the graphic chip 31a through the GDI in the navigation OS 32 and the GDI-based device driver 34, thereby enabling the graphic chip 31a to display the Internet browser screen as shown in FIG. 3(b) instead of the navigation screen as shown in FIG. 3(a).

Once the Internet browser 36 has been started, and a request to use the graphic-chip-only device driver 33 is sent from the manual switch 38 to the switch-input driver 39, the switch-input driver 39 outputs the control signal. Receiving the control signal, the device driver switching module 37 enables the graphic-chip-only device driver 33 to carry out the display as shown in FIG. 3(a), again.

According to the present embodiment 6, a user can freely select one of the OS-dependent general-purpose program and the device-dependent high-speed processing program as in the foregoing embodiment 1 by operating the manual switch 38.

Embodiment 7

Figure 8:
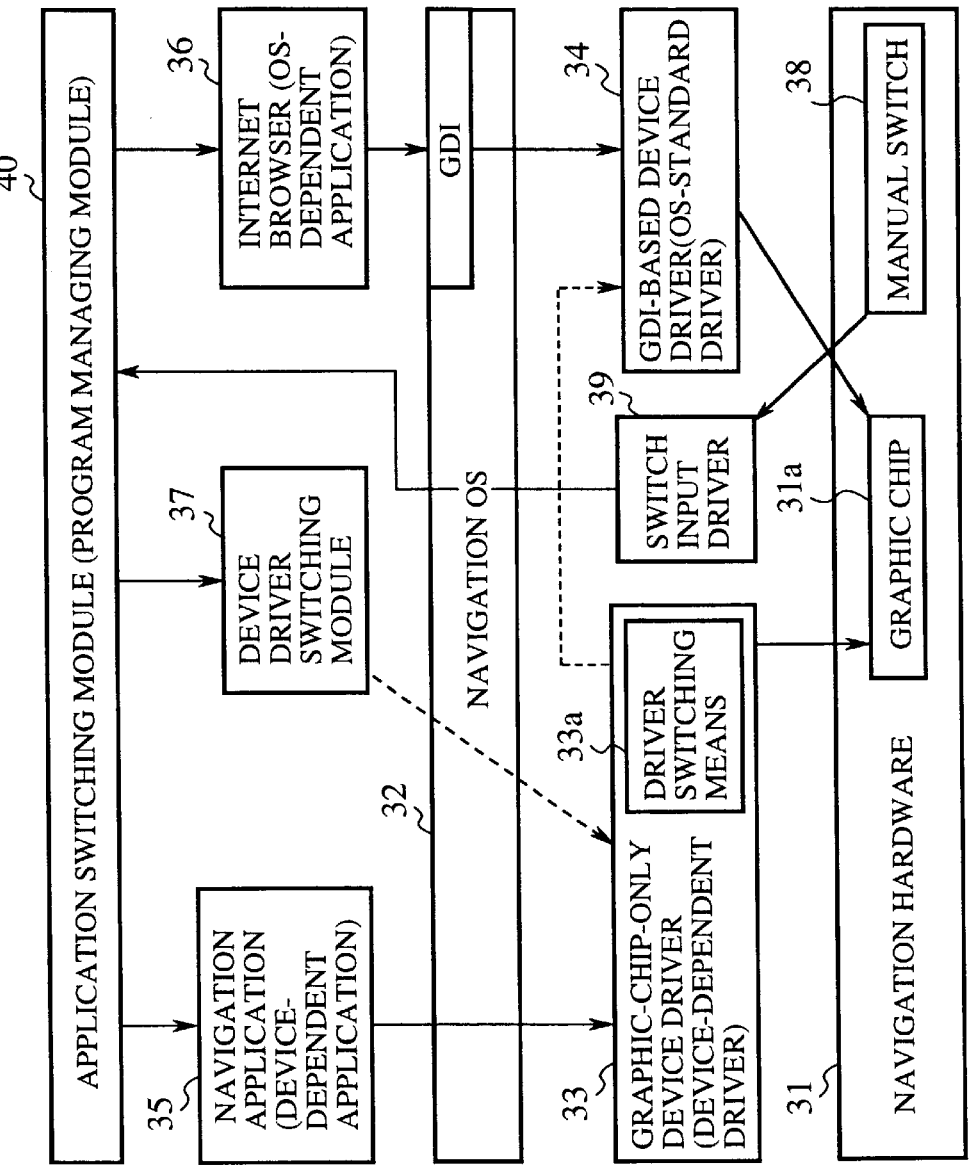
FIG. 8 is a block diagram showing a hierarchical configuration of an embodiment 7 of the navigation system in accordance with the present invention.

FIG. 8 is a block diagram showing a hierarchical configuration of an embodiment 7 of the navigation system in accordance with the present invention. The present embodiment 7 comprises a manual switch 38 in the navigation hardware 31; a switch-input driver 39 operating in response to a switching signal from the manual switch 38; and an application switching module 40 for carrying out switching operation in response to the output of the switch-input driver 39. The application switching module 40 controls the execution of the navigation application 35 and the Internet browser 36, and the display switching of the device driver switching module 37. Since the remaining configuration is the same as that of the foregoing embodiment 6, the description thereof is omitted here by designating the same components by the same reference numerals.

Next, the operation of the present embodiment 7 will be described.

When a user operates the manual switch 38 to provide the switch-input driver 39 with a request to switch the application, to use the navigation application 35, for example, the application switching module 40, receiving the control signal from the switch-input driver 39, enables through the device driver switching module 37 the navigation application 35 and the graphic-chip-only device driver 33 to carry out the display as shown in FIG. 3(a).

In this display state, when the user operates the manual switch 38 to request the switch-input driver 39 to carry out the application switching, to use the Internet browser 36, for example, the application switching module 40, receiving the control signal from the switch-input driver 39, enables the Internet browser 36, and disables the graphic-chip-only device driver 33 using the control signal from the device driver switching module 37. In the course of this, the graphic-chip-only device driver 33 enables the GDI-based device driver 34 using the control signal from the driver switching means 33a. Since the Internet browser 36 is coded to use the GDI, it controls the graphic chip 31a through the GDI in the navigation OS 32 and the GDI-based device driver 34, thereby enabling the graphic chip 31a to display the Internet browser screen as shown in FIG. 3(b) instead of the navigation screen as shown in FIG. 3(a).

When the user issues a request to use the navigation application 35 to the switch-input driver 39 by operating the manual switch 38, the switch-input driver 39 outputs the control signal. Receiving the control signal, the application switching module 40 enables the navigation application 35 and the graphic-chip-only device driver 33 through the device driver switching module 37 to carry out the display as shown in FIG. 3(a), again.

According to the present embodiment 7, the inter-application communications become unnecessary, which offers an advantage of being able to make the operation of the applications easier.

Embodiment 8

Figure 9:
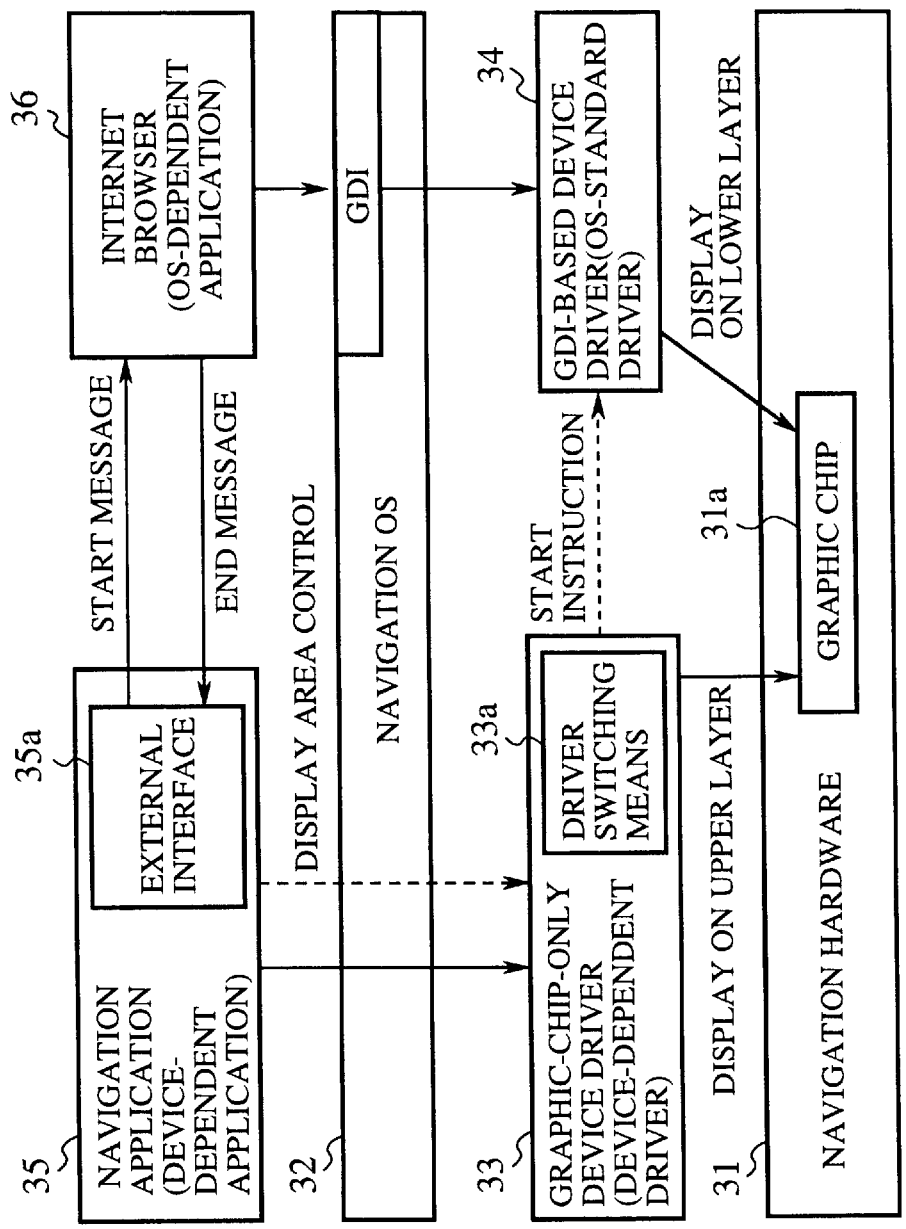
FIG. 9 is a block diagram showing a hierarchical configuration of an embodiment 8 of the navigation system in accordance with the present invention.

FIG. 9 is a block diagram showing a hierarchical configuration of an embodiment 8 of the navigation system in accordance with the present invention. The present embodiment 8 comprises a graphic chip 31a with multi-display layers so that the display of the navigation application 35 is carried out on the upper layer of the graphic chip 31a, and the display of the Internet browser 36 is carried out on the lower layer of the graphic chip 31a. Since the remaining configuration is the same as that of the foregoing embodiment 1, the description thereof is omitted here by designating the same components by the same reference numerals.

Next, the operation of the present embodiment 8 will be described.

Figure 10A:
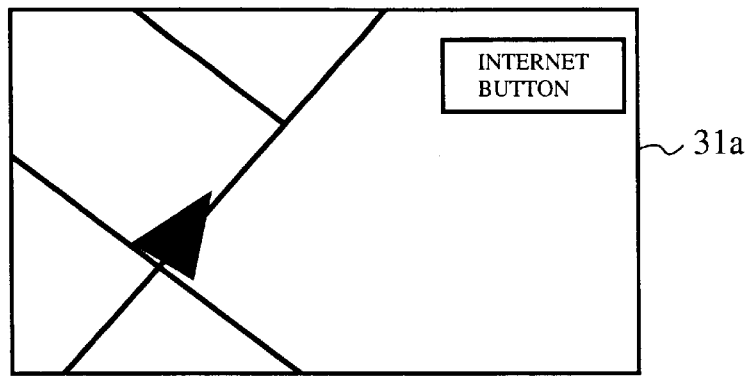
FIGS. 10(a)–10(d) are diagrams illustrating display examples in the embodiment 8 of the navigation system in accordance with the present invention.

When the navigation application 35 is activated, it performs its display on the upper layer of the graphic chip 31a using the graphic-chip-only device driver 33, thereby carrying out the high-speed drawing as shown in FIG. 10(a). In this display state, in response to the depression of the Internet button on the screen, the navigation application 35 actives the Internet browser 36 through the external I/F 35a, and enables the GDI-based device driver 34 through the graphic-chip-only device driver 33. Thus, the display as shown in FIG. 10(a) disappears, and the screen of the Internet browser 36 is displayed in the lower layer of the graphic chip 31a as shown in FIG. 10(d).

Figure 10B:
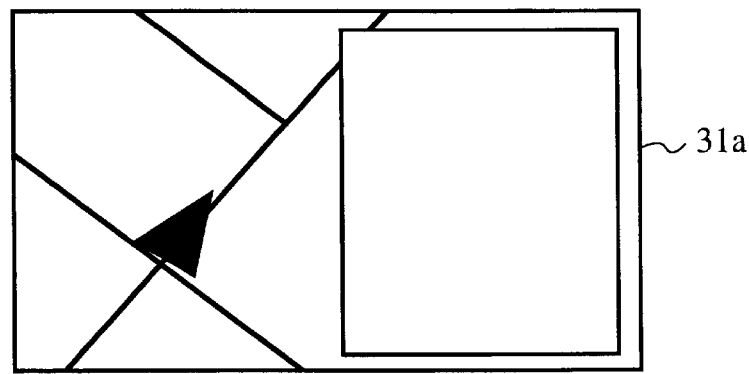
Figure 10C:
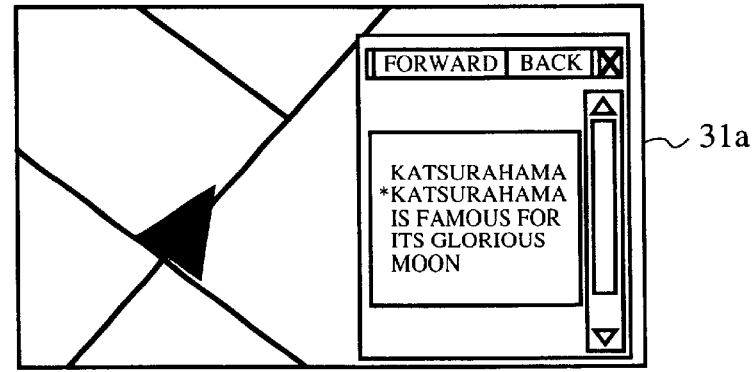
Figure 10D:
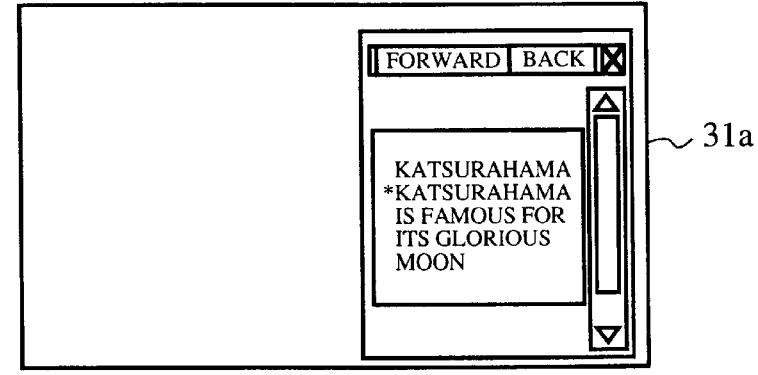

On the other hand, when the navigation application 35 issues a display area limit instruction, the upper layer display as shown in FIG. 10(a) is changed to the display as shown in FIG. 10(b). Thus, superimposing the lower layer upon the upper layer will produce the display as shown in FIG. 10(c). In this display state, when an Internet browser end message is issued, the upper layer display area returns to its primary screen as shown in FIG. 10(a).

As described above, the present embodiment 8 can display the images of both the applications. Accordingly, when the Internet provides display information linking with the function of the navigation like sightseeing information with spot information, for example, the present embodiment 8 can display the sightseeing spot along with the images of the navigation application, thereby implementing a system with improved usability. In addition, it offers an advantage of being able to eliminate screen flickering involved in the device driver switching because of obviating it.

Embodiment 9

Figure 11:
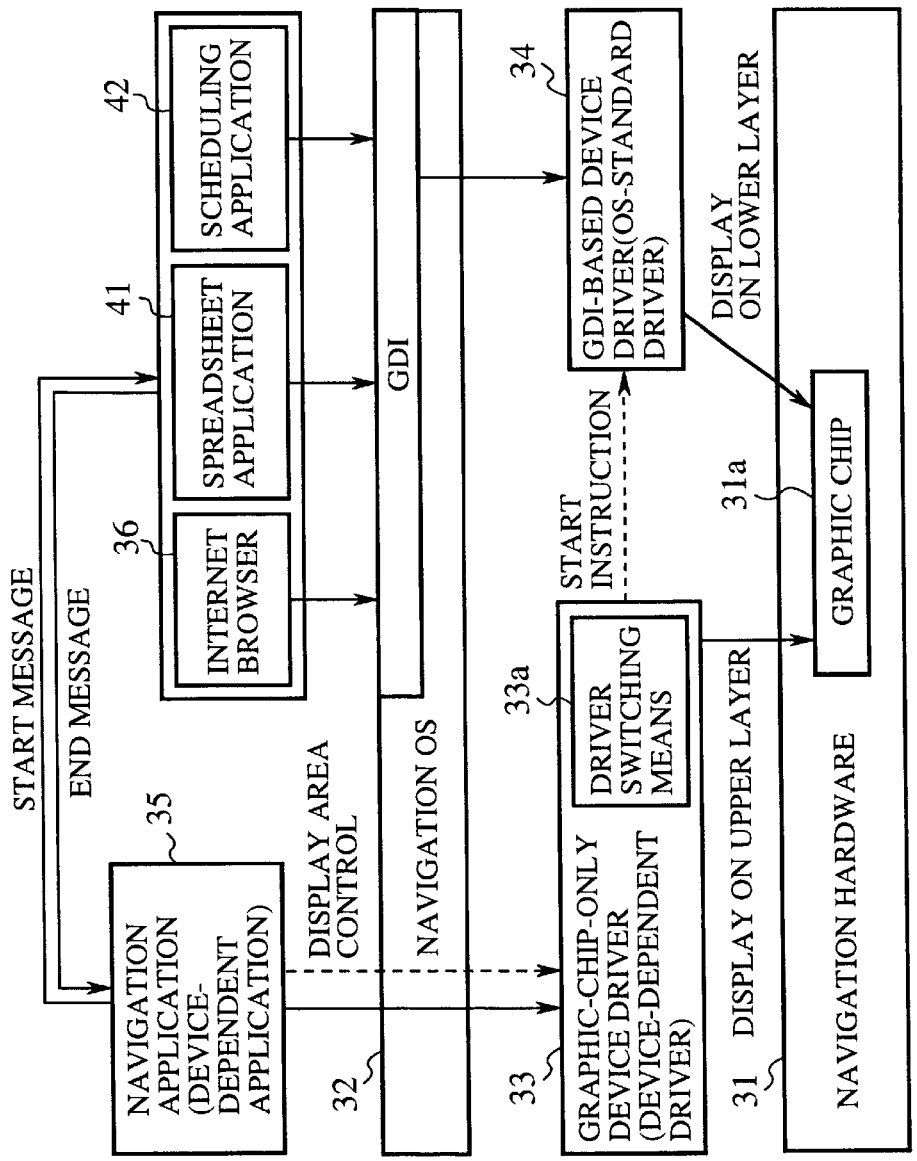
FIG. 11 is a block diagram showing a hierarchical configuration of an embodiment 9 of the navigation system in accordance with the present invention.

FIG. 11 is a block diagram showing a hierarchical configuration of an embodiment 9 of the navigation system in accordance with the present invention. It comprise a multi-display layer graphic chip 31a; and three applications including the Internet browser 36, a spreadsheet application 41 and a scheduling application 42 as the OS-dependent application. Since the remaining configuration is the same as that of the foregoing embodiment 8, the description thereof is omitted here by designating the same components by the same reference numerals.

Next, the operation of the present embodiment 9 will be described.

Figure 12A:
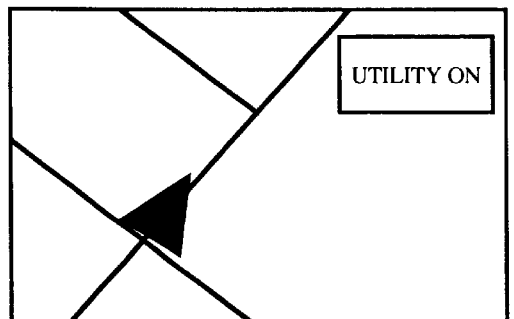
FIGS. 12(a)–12(e) are diagrams illustrating display examples in the embodiment 9 of the navigation system in accordance with the present invention.
Figure 12D:
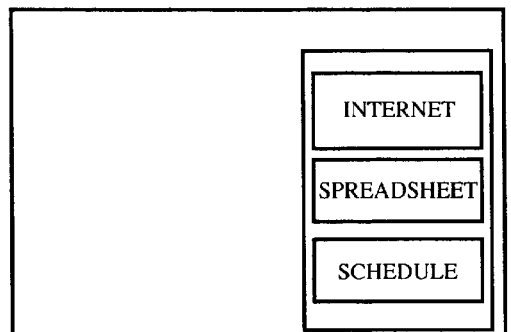

When the navigation application 35 is activated, it performs its display on the upper layer of the graphic chip 31a using the graphic-chip-only device driver 33, thereby carrying out the high-speed drawing as shown in FIG. 12(a). In this display state, in response to the depression of the utility-on button on the screen, the display as shown in FIG. 12(a) disappears, and the icons of the Internet browser 36, spreadsheet application 41 and scheduling application 42 are displayed in the lower layer of the graphic chip 31a as shown in FIG. 12(d).

Figure 12B:
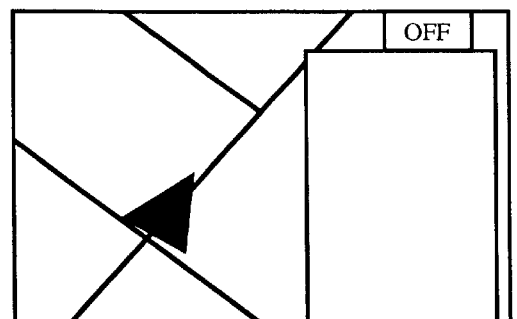
Figure 12E:
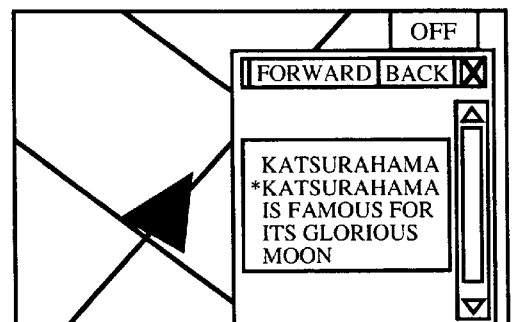
Figure 12C:
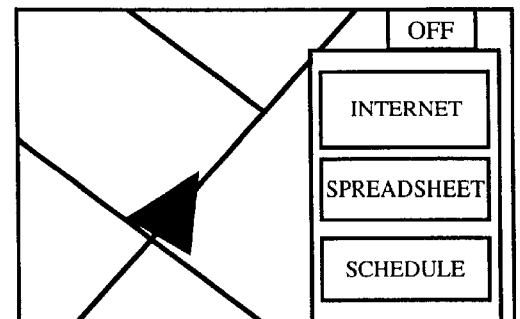

On the other hand, when the navigation application 35 issues a display area limit instruction, the upper layer display as shown in FIG. 12(a) is changed to the display as shown in FIG. 12(b). Thus, superimposing the lower layer upon the upper layer will produce the display as shown in FIG. 12(c). In this display state, when one of the icons is depressed, the display becomes as shown in FIG. 12(e).

In this display state, in response to the depression of the OFF button on the screen, the display of the upper layer is returned to its primary screen as shown in FIG. 12(a). In this case, the navigation application 35 completes the operation of the Internet browser 36, the spreadsheet application 41 or the scheduling application 42.

As described above, the present embodiment 9 can display the images of both the device-dependent application and OS-dependent application at the same time. Accordingly, it offers an advantage of being able to implement a system with improved usability.

Embodiment 10

Although not shown in a drawing, the present embodiment 10 differs from the foregoing embodiments 8 and 9 in that it displays the images of the OS-dependent application in the upper layer of the graphic chip 31a, and the images of the navigation application in the lower layer of the graphic chip 31a, offering a similar advantage. Although it depends on the performance of the display unit, the foregoing embodiments 8 and 9 can usually achieve better results with a device that accomplishes higher performance in displaying high-speed images in the upper layer, whereas the present embodiment 10 can obtain better result in the opposite case.

Embodiment 11

Figure 13:
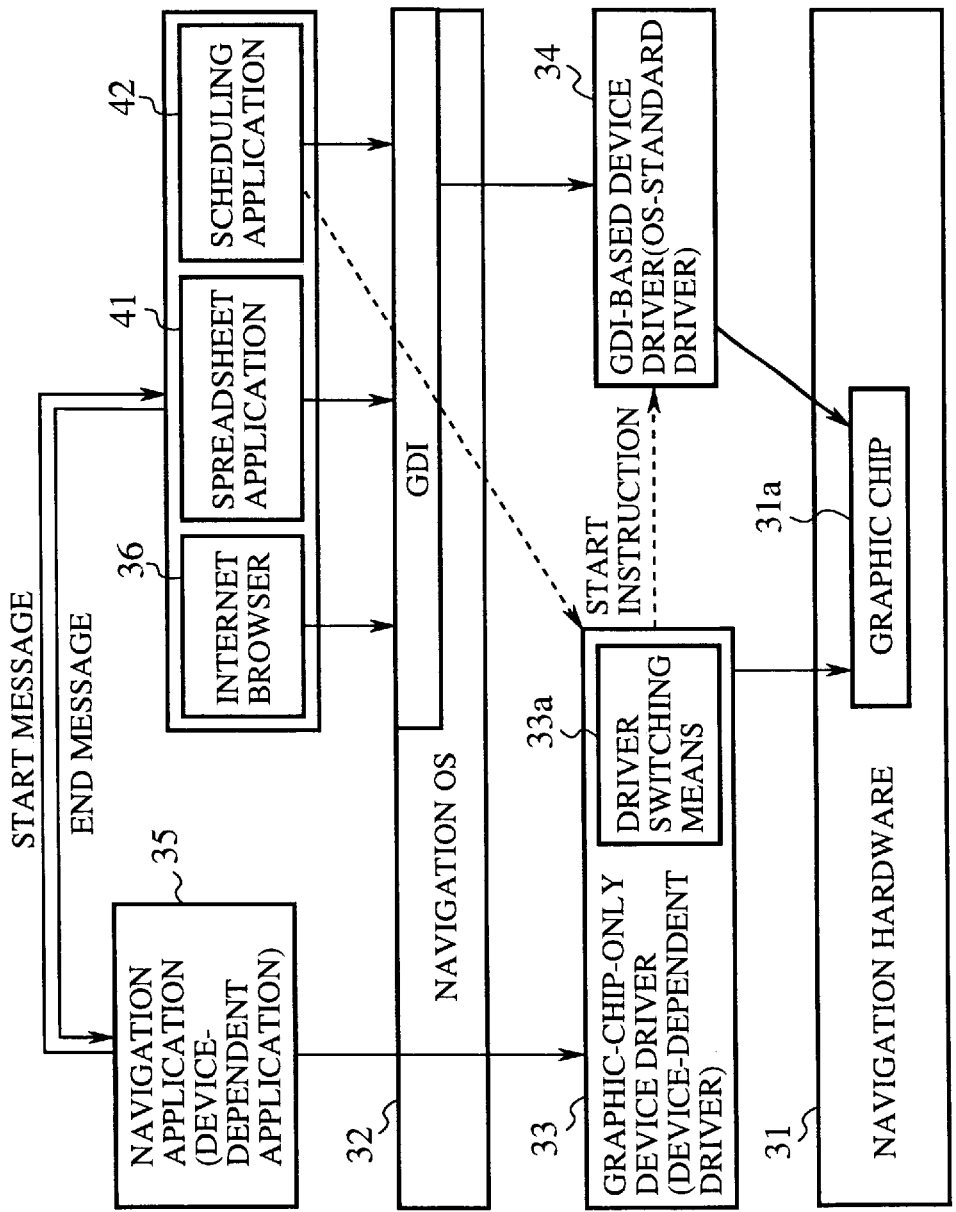
FIG. 13 is a block diagram showing a hierarchical configuration of an embodiment 11 of the navigation system in accordance with the present invention.

FIG. 13 is a block diagram showing a hierarchical configuration of an embodiment 11 of the navigation system in accordance with the present invention. It comprises a display area control application 43 instead of the scheduling application 42 in the embodiment 9 as shown FIG. 11. The display area control application 43 controls the display area of the graphic-chip-only device driver 33. Since the remaining configuration is the same as that of the foregoing embodiment 9, the description thereof is omitted here by designating the same components by the same reference numerals.

Next, the operation of the present embodiment 11 will be described.

Figure 14A:
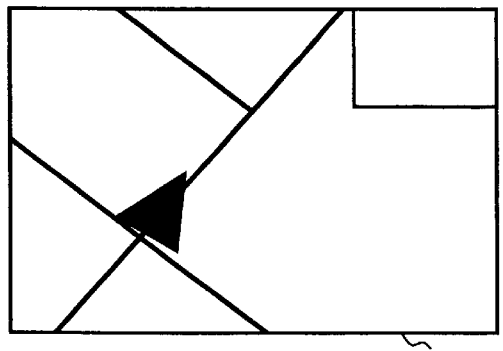
FIGS. 14(a)–14(e) are diagrams illustrating display examples in embodiment 11 of the navigation system in accordance with the present invention.
Figure 14D:
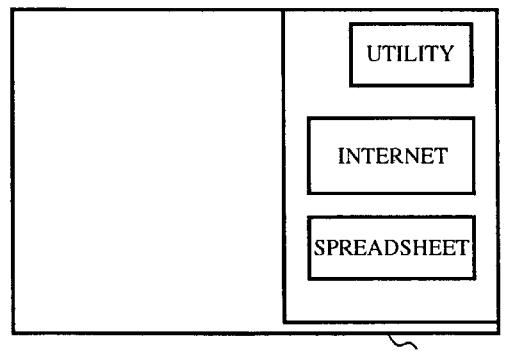
Figure 14B:
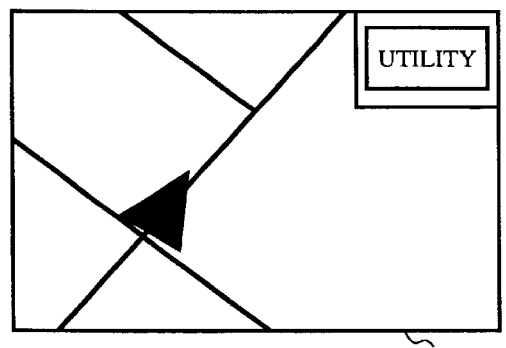

When the navigation application 35 is activated, it carries out the display operation in the upper layer of the graphic chip 31a using the graphic-chip-only device driver 33, first. Its initial screen is as shown in FIG. 14(a). The screen of the lower layer is as shown in FIG. 14(d), resulting in the screen as shown in FIG. 14(b).

Figure 14E:
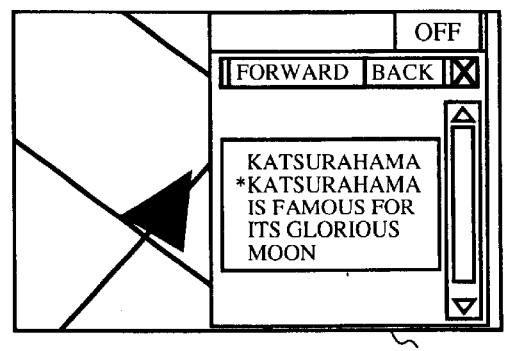
Figure 14C:
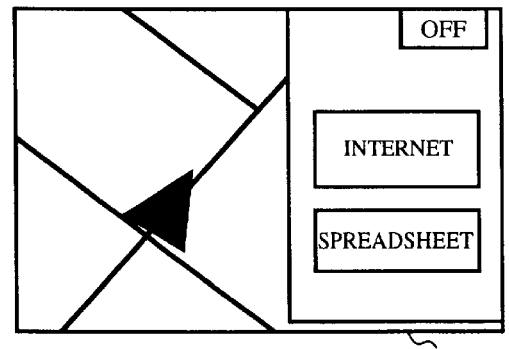

In this display state, in response to the depression of a utility button on the screen, the display area control application 43 narrows the upper layer (increasing the display area of the lower layer), displaying the icons as shown in FIG. 14(c). In response to the depression of a selected icon, the display area control application 43 detects the activation of the Internet browser 36, for example, and further reduces the upper layer display area, resulting in the display as shown in FIG. 14(e). In this display state, in response to the depression of the OFF button, the display area control application 43 returns the display area, providing the screen as shown in FIG. 14(b). Thus, controlling the size of the display area to be changes in accordance with the applications can make effective use of the screen resources.

Embodiment 12

Figure 15:
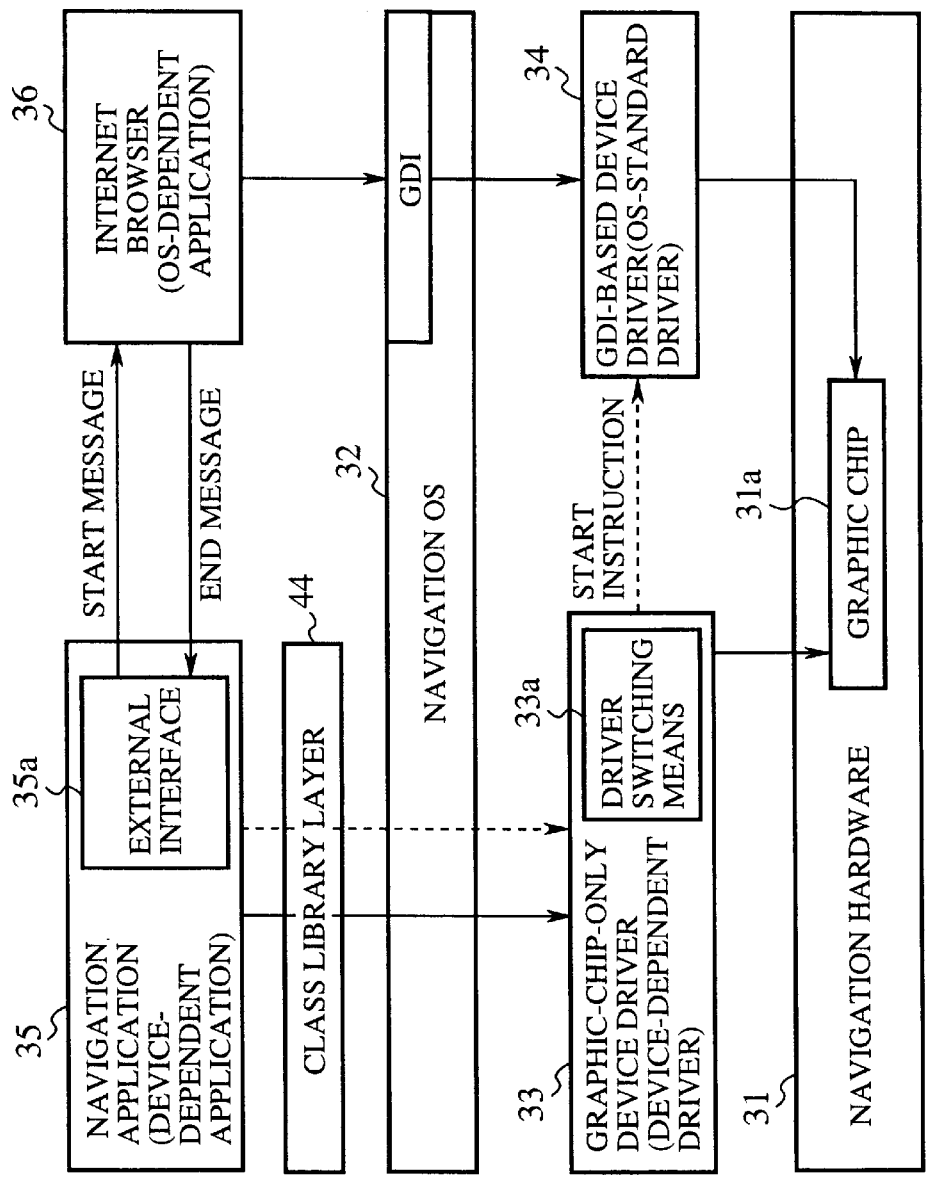
FIG. 15 is a block diagram showing a hierarchical configuration of an embodiment 12 of the navigation system in accordance with the present invention.
Figure 16:
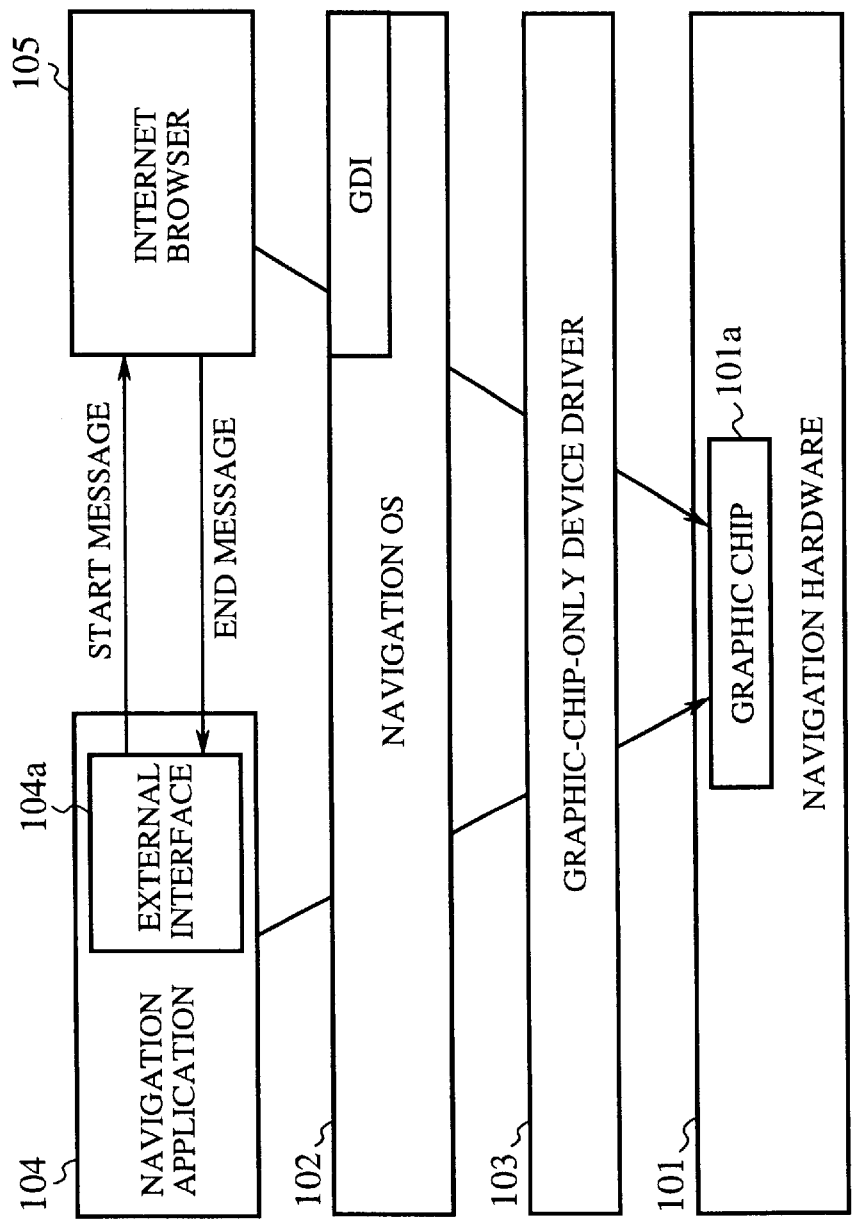
FIG. 16 is a block diagram showing a hierarchical configuration of a conventional navigation system.

FIG. 15 is a block diagram showing a hierarchical configuration of an embodiment 12 of the navigation system in accordance with the present invention. It comprises a class library layer 44 for making the graphic-chip-only device driver 33 as thought it were the GDI-based device driver 34 when seen from the navigation application 35. The remaining configuration and operation are the same as those of the foregoing embodiments.

As described above, the present embodiment 12 can facilitate the production of the navigation application.

What is claimed is:

1. An on-vehicle information processing unit comprising:
  a central processing unit;
  a first device connected to said central processing unit;
  a device-dependent driver for driving only said first device;
  an operating-system-standard (OS-standard) driver enabling an application to drive devices different from said first device;
  a device-dependent application using said first device through said device-dependent device;
  an operating-system-dependent (OS-dependent) application using said first device through said OS-standard driver, and
  driver switching means for switching between said device-dependent driver and said OS-standard driver, wherein said device-dependent application controls said driver switching means by carrying out inter-program communication with said OS-dependent application.

2. The on-vehicle information processing unit according to claim 1, wherein said central processing unit comprises switching means for enabling said OS-dependent application only when using an Internet function, and for operating said device-dependent application in a normal mode.

3. The on-vehicle information processing unit according to claim 2, further comprising a device driver switching module for enabling said device-dependent driver in response to a request of said device-dependent application, and for enabling said OS-dependent driver in response to a request of said OS-dependent application.

4. The on-vehicle information processing unit according to claim 1, further comprising a device driver switching module for enabling said device-dependent driver in response to a request of said device-dependent application, and for enabling said OS-dependent driver in response to a request of said OS-dependent application.

5. The on-vehicle information processing unit according to claim 4, wherein said device driver switching module enables one of said device-dependent drives and OS-dependent driver in response to operation of a manual switch.

6. The on-vehicle information processing unit according to claim 4, wherein said central processing unit further comprises a program managing module for controlling execution of said device-dependent application and said OS-dependent application, and said device driver switching module switches said device drivers in response to a request of said program managing module.

7. The on-vehicle information processing unit according to claim 1, wherein said first device is a display device having multi-display layers, and displays an image associated with said device-dependent application on an upper layer, and an image associated with said OS-dependent application on a lower layer.

8. The on-vehicle information processing unit according to claim 7, wherein said first device simultaneously displays images associated with both said device-dependent application and said OS-dependent application by limiting at least one of display areas of said upper display layer and said lower display layer.

9. The on-vehicle information processing unit according to claim 1, wherein said OS-dependent application operates on a virtual machine.

* * * * *